Nov. 15, 1932.  C. M. KNIGHT  1,888,089
CONTROLLER CONSTRUCTION
Original Filed Feb. 11, 1925    5 Sheets-Sheet 1
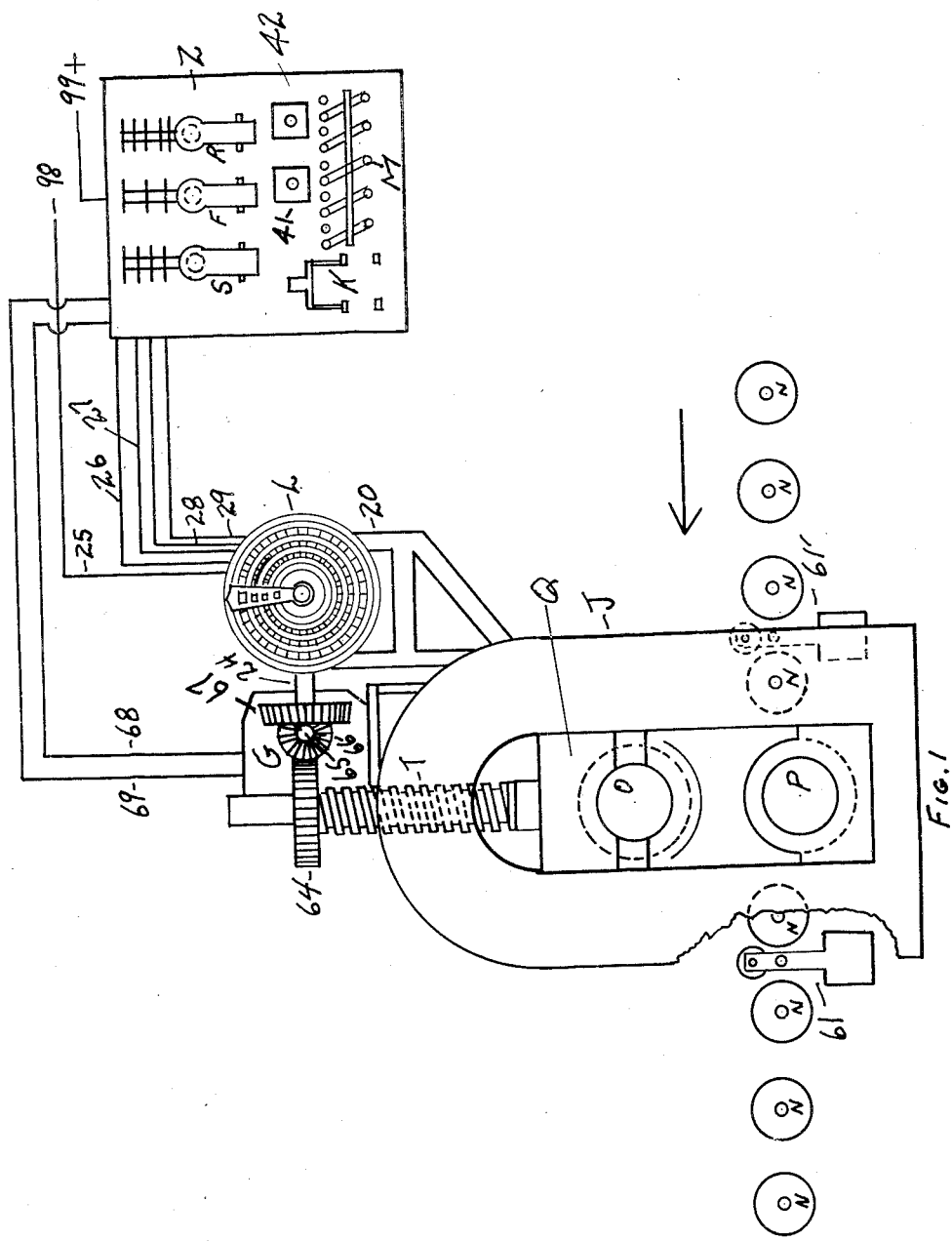
INVENTOR.
CLAUDE M. KNIGHT,
BY
Saywell & Wesseler
ATTORNEYS.

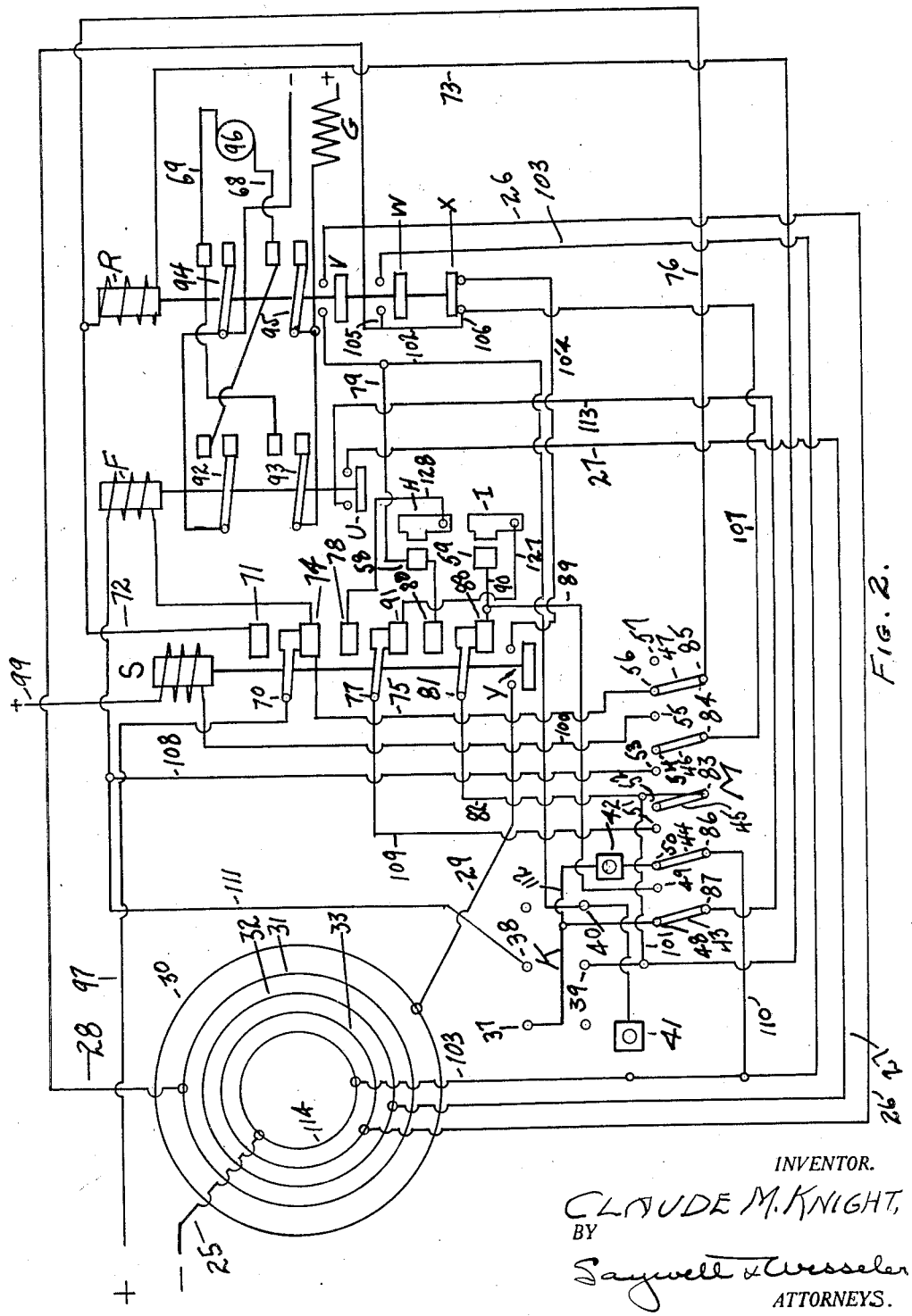

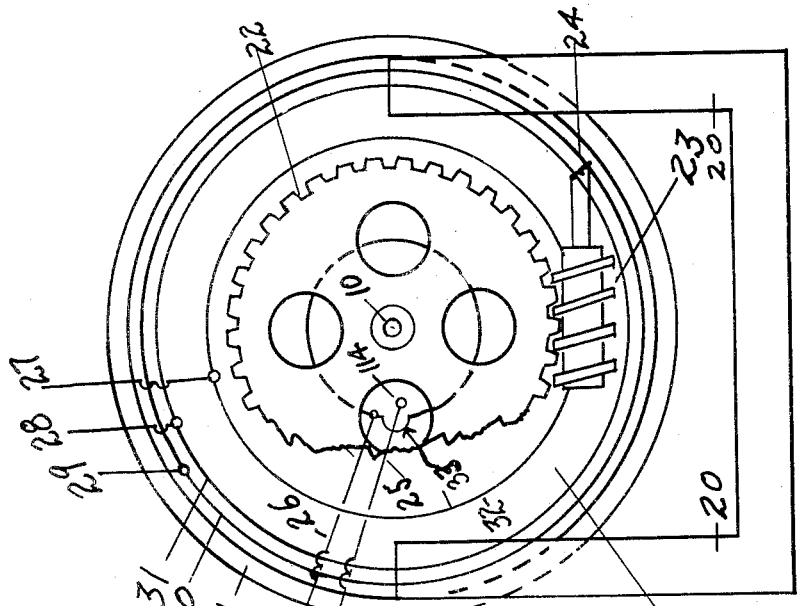

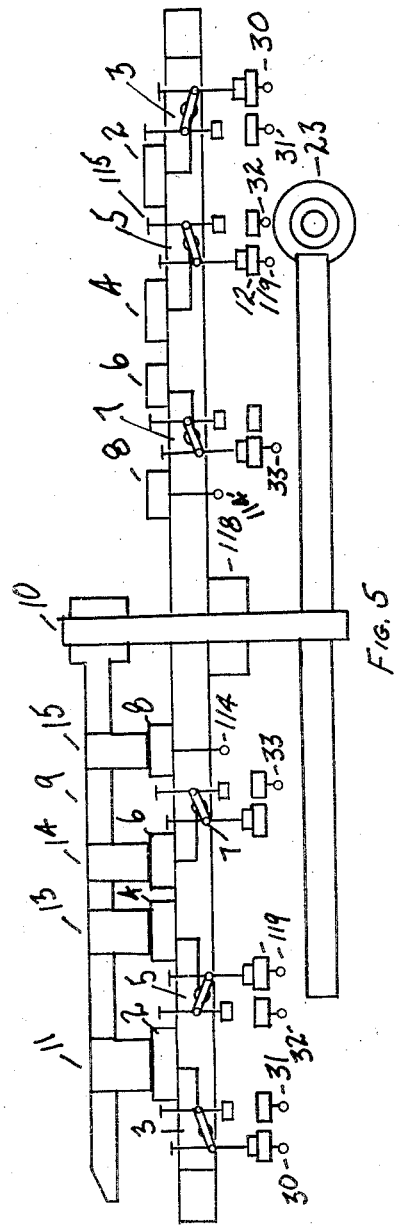
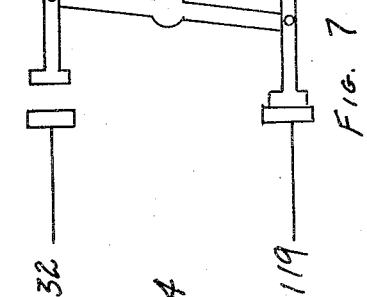
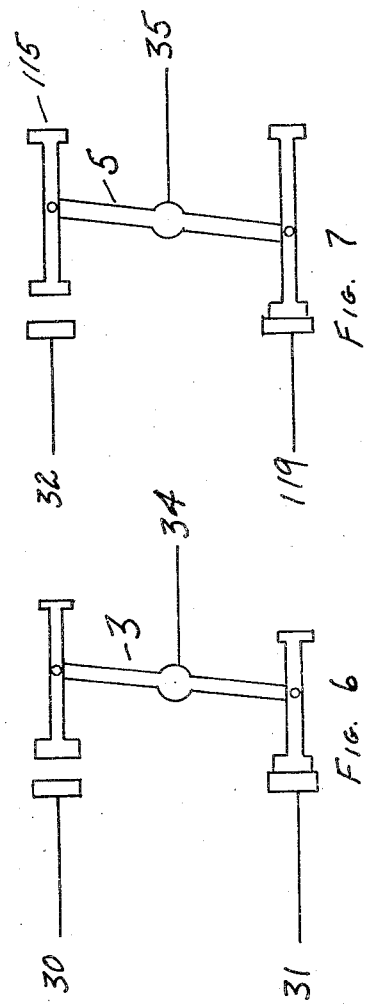

Nov. 15, 1932.  C. M. KNIGHT  1,888,089
CONTROLLER CONSTRUCTION
Original Filed Feb. 11, 1925  5 Sheets-Sheet 5
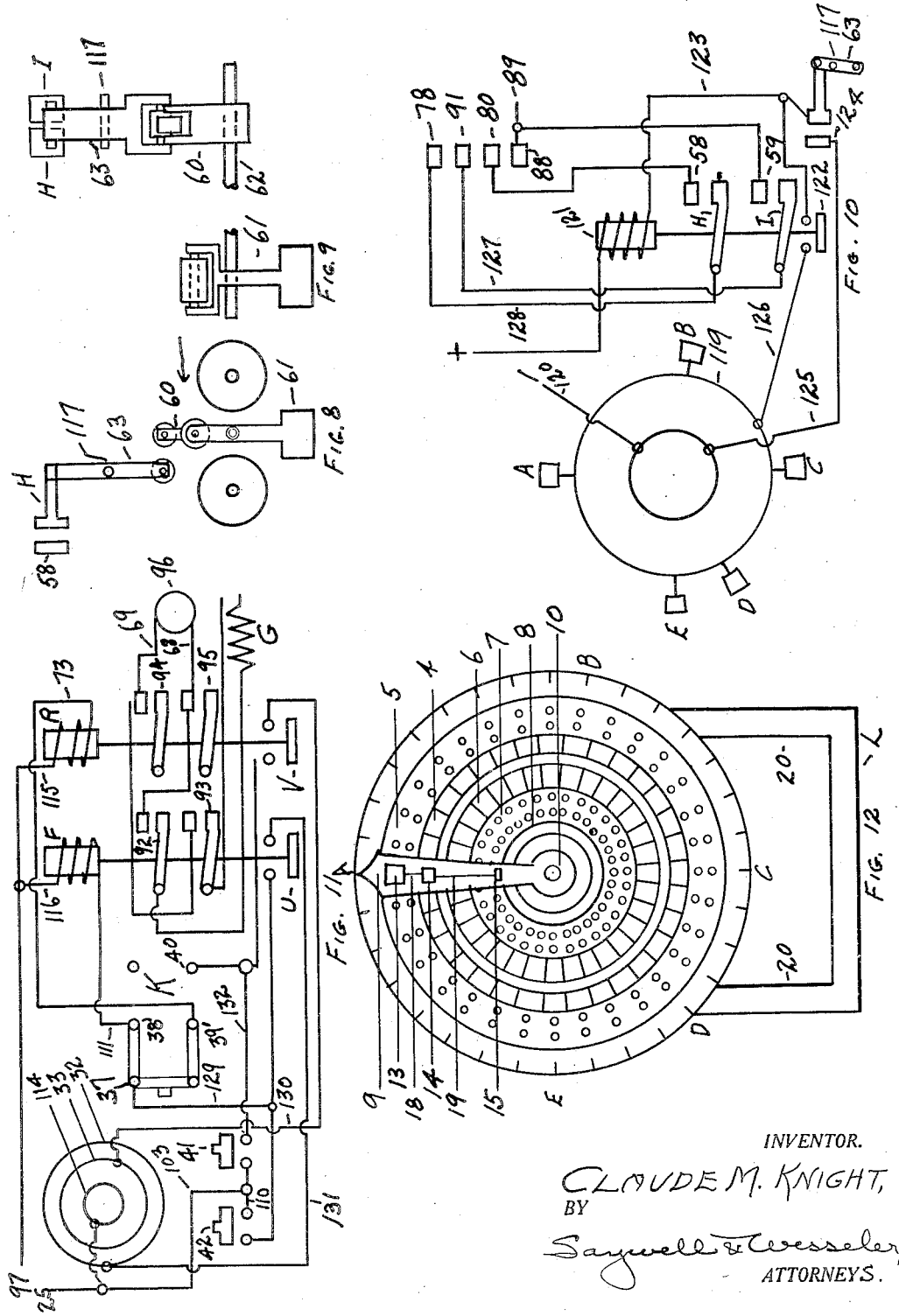
INVENTOR.
CLAUDE M. KNIGHT,
BY
Saywell & Wesseler
ATTORNEYS.

Patented Nov. 15, 1932

1,888,089

UNITED STATES PATENT OFFICE

CLAUDE M. KNIGHT, OF CLEVELAND, OHIO

CONTROLLER CONSTRUCTION

Original application filed February 11, 1925, Serial No. 8,382, now Patent No. 1,832,400. Divided and this application filed November 16, 1931. Serial No. 575,388.

This invention, as indicated, relates to a controller construction especially adapted for electric motors. More particularly it has in view a controller construction especially adapted for use in connection with the control of the screw-down motor of a rolling mill, but not limited to such use, and while the device will be described in connection with such system and apparatus, it is to be understood that the invention is not thereby to be limited in any way to such particular use.

This application is a division of my application Serial No. 8,382, filed February 11, 1925 now Patent Number 1,832,400.

In the course of operation of adjusting the position of the rolls in a steel mill it is desirable to have perfect control of the screw-down motor of the type referred to, with absolute reliability of operation, and the system of control herein provided includes the means for automatically starting, stopping and reversing an electric motor, as well as means for varying the points at which such automatic action takes place and includes auxiliary manually controlled means which may be substituted in part or in whole for various portions of the automatically controlled means at any time that the operator of the mechanism desires to substitute such control, such change from one method of control to another being capable of being made at the will of the operator without the necessity of making numerous preliminary changes. The control may be completely automatic, including starting, stopping and reversing of the motor, it may be a manual control with provision for automatic stopping of the motor only, it may be a complete manual control, or it may comprise the manual starting of the apparatus and automatic stopping of the same and automatic reversing of the mechanism.

In addition to the variety of the control provided for, it has been found desirable to introduce additional features of construction which, while not absolutely essential to the carrying out of the controls referred to, serve as safety devices to insure reliability of action.

In rolling mill practice it is usual to have one of each pair of rolls adjustable in order to bring the billet or piece of work operated on to the desired dimensions. The adjustment of the movable roll is usually provided for by means of an electric motor and the control system for such motor is designated a screw-down controller.

The principal object of my invention is to provide control means which will cause an electric motor to operate in certain predetermined stages in either direction of travel. Another object of said invention is to provide for the starting, stopping or reversing of an electric motor at predetermined intervals. A further object of said invention is to provide for a variable degree of manual control which may be used alternatively to the automatic control of an electric motor. Another object of the invention is to provide for the ready adjustment of the range of action of the motor control mechanism. A further object is to provide safety control elements to insure certainty of action of the screw-down motor. Another object of said invention is to coordinate the screw-down motor controller with the other mechanism of the rolling mill, and in accord with the position of the work operated upon. Other and further objects of the invention will appear in the course of the following description.

While the description of this invention relates to the application of the same to a screw-down motor for a rolling mill, it is obvious that certain portions of the invention are of general application and, as has been stated, it is therefore not intended to in any way restrict the scope of the claims to the particular construction illustrated and described. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation of a rolling mill having a screw-down motor and motor control embodying the principle of my invention; Fig. 2 is a diagrammatic view showing the electrical circuits and associated mechanism of the controller system; Fig. 3 is a front elevation of the controller dial; Fig. 4 is a rear elevation of the controller mechanism with portions broken away to illustrate the circuit connections; Fig. 5 is an enlarged diagrammatic view of the apparatus as seen along the line 5—5 shown in Fig. 3, looking in the direction of the arrows; Figs. 6 and 7 are side elevations of segment switches carried by the controller dial; Fig. 8 is a side elevation of a trigger switch adapted to be operated by contact with the work passing through the rolls; Fig. 9 is an end elevation of the trigger switch shown in Fig. 8; Fig. 10 is a diagrammatic view showing an alternative form of electrical connections and associated mechanism for the trigger switch; Fig. 11 is a diagrammatic view showing a simplified form of the controller system whereby it is adapted to operate an electric motor in stages; and Fig. 12 is a front elevation of a dial adapted for the controller system shown in Fig. 11.

The apparatus, as is disclosed in Fig. 1, comprises a frame J within which are mounted a pair of rolls O, P, such as are used in rolling mills for reducing ingots, billets or other work pieces to the desired shape and dimensions. The rolling mill may be of any standard design and the details thereof form no part of the present invention. The mill illustrated is a reversible mill of the "two-high roll" type of construction. The upper roll O is vertically adjustable and the ends thereof are journaled in supporting blocks Q slidably engaged in the end portions of the frame J. Each supporting block is screw-threadedly engaged upon a vertical adjusting screw T rotatably engaged in the respective side portion of the frame. Each of said adjusting screws has a worm gear 64 mounted adjacent its upper end.

A screw-down motor G is supported on the upper side of said frame and the shaft 65 thereof is provided with a worm (not shown) for driving each of said worm gears 64. The outer end of said shaft 65 is provided with a beveled gear 66 which intermeshes with a beveled gear 67 mounted on the end of the shaft 24 which is supported within the housing of the screw-down controller L. Said screw-down controller is mounted upon a support 20 at one side of the frame J adjacent the motor G and, as shown in Fig. 4, is provided with a shaft 10 journaled in a bearing 118 in said support and driven by a gear wheel 22 actuated by a worm 23 upon the shaft 24 heretofore referred to. The controller shaft thus is actuated by the screw-down motor which drives the adjusting screws for the roll and the motion of said controller shaft corresponds in direction with that of said motor G.

A series of feed rolls N is provided, extending on either side of the mill in alignment with the upper edge of the stationary roll P, and adjacent the side edges of the frame J, intermediate a pair of said feed rolls, a pair of triggers 61, 61', is pivotally supported.

The mechanism associated with said triggers is disclosed in Figs. 8 and 9. As therein disclosed each trigger is mounted at an intermediate position upon a shaft 62, which carries at its rearward end an upwardly projecting arm 60, the path of movement of which carries it past the lower end of a switch lever 63 pivoted adjacent its upper end upon a pivot pin 117 and carrying a laterally extending arm upon which switch contacts H, I, are mounted. Said contacts, in the normal vertical position of said lever 63, are adapted to be spaced a short distance from a pair of stationary contact terminals 58, 59. The action of the mechanism just described will be indicated in connection with the description of the electric circuits of the control mechanism.

Mounted upon a suitable support adjacent the controller a switchboard Z is provided, as is shown in Fig. 1, said switchboard carrying a knife switch K, a pair of push-button switches 41, 42, a five blade switch M, and the electro-magnetic switches S, F and R. The specific action of these several switches will be made clear in connection with the description of the circuits of the control system.

The controller, shown more particularly in Figs. 3, 4, and 5, comprises a supporting frame 20 upon which a dial 1 of suitable non-conducting material is mounted. The shaft 10, heretofore described, extends through the base and has the drive gear 22 secured to one end of the same and the indicator arm 9 secured to its opposite end. The dial is of circular shape and is provided at its marginal edge with an annular scale which may be adjusted about its periphery to bring the markings to any point desired. Attached to the dial are a plurality of segment rings 2, 4 and 6 concentrically arranged with respect to each other, each ring being formed of closely juxtaposed segments of suitable current conducting material such as copper, and each segment being insulated from every other segment in the same ring and the several segment rings being insulated from each other. A continuous ring 8 of similar material to that of the segment rings is provided concentrically within the segment rings and all of said rings are concentric with the shaft 10. Arranged circumferentially of the segment ring 2 a series of individual segment switches 3 is provided by means of which each individual segment may be alternatively connected to the conducting rings 30 or 31 arranged immediately beneath the same.

At a point between the segment rings 4 and 2, a series of individual segment switches 5 is provided for connecting the individual segments 4 which alternatively may be connected to the conducting ring 32 or the contact 12. A similar series of individual contact switches 7 is interposed between the segment ring 6 and the continuous contact ring 8. These individual switches are adapted to connect their respective segments to the conducting ring 33 or to disconnect it therefrom as desired. In the description of the operation of this apparatus to follow, the term "connecting segment" will be used to refer to the connection of a segment in the ring 6 to the conducting ring 33, or of a segment in the ring 4 to the conducting ring 32, and of a segment in the ring 2 to the conducting ring 31, and the expression "disconnected segment" will be used to refer to any of such segments as have been disconnected from their respective conducting rings 32, 33 and 31 by means of their individual switches just described.

The individual switches 3 and 5 are illustrated in enlarged detail in Figs. 6 and 7 of the drawings and in Fig. 5 is shown the connection of said switches with their respective segment plates. In said Fig. 5 there also are shown the brushes 11, 13, 14 and 15 mounted upon the arm 9 in position to make contact respectively with the segments of the rings 2, 4 and 6 and with the continuous ring 8. These brushes are formed of suitable current conducting material and the brushes 11, 13 and 14 are of such size that they may make contact with but one segment of their respective rings at a time when centered on the segment, and said segments are so spaced that the respective brushes will not clear one segment before making contact with the next adjacent segment in the direction of motion.

The means for driving the arm 9 has been above described and in order to have said arm travel about the dial with the proper degree of motion it is desirable to have the gear ratio between the motor G and the shaft 10 such that the arm will make less than one complete revolution while said motor is operating from its starting point to its limit of travel in either direction. As has been stated, the scale 21 may be adjusted about the controller dial, and such adjustment is necessary when rolls of different dimensions and other variable factors are to be provided for.

Circuit connections are clearly shown in Fig. 2 of the drawings. For the automatic operation of the device the trigger switches H, I, heretofore described, are actuated as the work passes through the rolls and the screw-down mechanism is operated between the several passes to set the rolls at the predetermined spacing. The electro-magnetic switch F and its associated circuits are used to control the successive screw-down operations of the motor G. After the last pass of the work through the rolls the electro-magnetic switch S is brought into action, which, through its associated circuits and the electric magnetic switch R, serves to reverse the motor G and restore the screw-down control system to its original position.

The five blades of the switch M are placed on the right hand contacts, shown in Fig. 2, when the full automatic action of the apparatus is desired. When, however, it is desired to assume manual control of the screw-down mechanism but still retain the automatic stopping of the motor, the five blades of the switch M are thrown to the left-hand contacts, shown in Fig. 2, and the knife switch K is thrown to the left if a forward motion of the motor G is desired and to the right if a reverse travel of said motor is to be provided for. The push-button switches 42 and 41 are utilized to start the motor in forward and reverse direction respectively.

When complete manual control of the screw-down motor is to be provided for the five bladed switch M is thrown to the left, as shown in Fig. 2, and the knife switch K is opened and the push-button switches 41 and 42 are locked in closed position. The swinging of the knife switch K to the left then operates the motor in a forward direction, while the swinging of said switch to the right serves to reverse the action of said motor. Any of the standard devices for quickly stopping the motor by braking may be employed, the device forming no part of this invention. Obviously, when the knife switch is thrown to an intermediate position the motor is quickly brought to rest.

The detailed description of the several circuits and their associated parts will now be taken up in connection with a description of the operation of the apparatus when used successively as an automatic, semi-automatic and manually controlled device. Where complete automatic control of the apparatus is to be had and it is desired to roll a piece of steel to a size that will require it being passed through the rolls O and P five times, with an adjustment of the roll O through the screw-down mechanism between each of said passes, the index on the arm 9 is positioned at some selected starting point such as opposite the letter "A", shown adjacent said indicator in Fig. 3 of the drawings. The gear ratio between the parts must then be such as to bring the indicator to a second point, for example the point B when the rolls are in position for the second pass, opposite another point, for example that marked C for the third pass, opposite another point, for example the point marked D for the fourth pass, and opposite another point, for example the point marked E for the last pass.

The segments in the ring 4 at the points A, B, C, D, and E, are disconnected from the conducting ring 32 by means of their respective individual switches 5. All other segments in the ring 4 are left in connection with the conducting ring 32, and in the ring 6 all segments are connected to the conducting rings 33 by means of their individual switches 7, except the segments opposite the points marked A and E, which switches are disconnected from the conducting ring 33 by means of their individual switches.

The five blades of the switch M are then swung to the right-hand contacts and the switch K and the push button switches 41 and 42 are left in open position. The brushes 11, 13 and 14 on the arm 9 are in contact with the segments of the rings 2, 4 and 6, respectively, opposite the point A.

The feed rolls are then caused to rotate in a direction to cause the billet or piece of work operated upon to approach the mill from the right-hand side of the view shown in Fig. 1 of the drawings, and in the course of its progress over said rolls and through the mill the billet will depress the trigger 61' toward the rolls. The trigger 61' has associated therewith a mechanism identical with that shown in Figs. 8 and 9 in connection with the trigger 61, but the positions of said parts are reversed, inasmuch as said trigger is on the opposite side of the rolls. When the work passes over the companion trigger 61, said trigger will be depressed away from the rolls which will cause the projecting arm 60 thereof to contact with the lever 63, which will then resume its normal vertical position. As soon as the billet has passed over the trigger 61 said trigger will be released so that it may be returned through action of its weighted lower end to a vertical position and in thus moving its arm 60 will strike the lever 63 and will bring the contactors H and I against the terminal elements 58 and 59, thus closing the circuit of the electric magnetic switch F. The circuit will be completed through the feed line 97 to the terminal 70, across the contactor supported upon the electro-magnetic switch S to the terminal 74, then through the coil of the electro-magnetic switch F, the conductor 111 and the conductor 108 to the terminal 53, and across the switch blade 45 of the switch M to the terminal 83, thence through the conductor 82 to the terminal 81, across the contactor of the switch S to the contact 88, thence through the conductor 90 to the terminal 59, through the contactor I and conductor 127, to the terminal 91, across the contactor of the switch S to the terminal 77, thence through the conductor 109 to the terminal 51, across the switch blade 44 of the switch M to the terminal 86, thence through the conductor 110 and the conductor 103 to the conductor ring 114, thence through the line conductor 25 to the current source.

When the circuit above described is closed the coil of the electro-magnetic switch F is energized and the contactor bars 92 and 93 are drawn upwardly so as to close the circuits through the field coils and armature 96 of the motor G, causing the same to rotate in a forward direction which will drive the arm 9 of the controller in a clockwise direction and brings the brush 13 carried thereon into contact with successive segments of the ring 4 which have been connected to the conductor ring 32 through their respective individual switches, as hereinbefore described. The motor therefore continues to operate in the forward direction, notwithstanding that the contactors H and I have been brought against the terminals 58 and 59 for only a brief period, inasmuch as the energizing of the electro-magnetic switch F has closed a maintaining circuit through the switch U actuated thereby. In this secondary circuit the current flows through the feed line 97 to the terminal 70, across a contactor of the switch S to the terminal 74, through the coil F, thence through the conductor 111 and the conductor 108 to the terminal 53, across the blade 45 of the switch M to the terminal 83, thence through the conductor 82 to the terminal 81, across the contactor of the switch S to the terminal 88, thence through the conductor 89 to the terminal 49, across the switch blade 43 of the switch M to the terminal 87, thence through the conductor 113 to the switch U, through the conductor 27 and the conductor ring 32, through the individual switch 5 to the segment 4, and thence through the brush 13 and the conductors 18 and 19 connecting the several contact brushes on the arm 9 to the brush 15, and through said brush to the continuous ring 8 and its conducting ring 114, and thence through the conductor 25 to the current source.

The electro-magnetic switch F continues to be energized in this manner until the motor has traveled in a forward direction a sufficient distance to bring the arm 9 to a position opposite the point marked B, whereupon the brush 13 will be brought into contact with the segment 4 opposite said point B, which has been disconnected from the conductor ring 32. The circuit will thus be broken at this point and the electro-magnetic switch F will be de-energized and the contacts 92 and 93 supported thereby will be opened, causing the motor circuit to be opened and the motor brought to a stop.

During the period of action of the motor G, while the controller arm 9 was being moved from the position A to the position B, the lowering screws T of the steel mill were actuated to lower the roll O until the same was brought into the proper position before the second pass of the billet through the rolls. This second pass of the work through the rolls will be from the opposite side of the mill to that from which the billet started and the rolls are caused to rotate in a different direction by means of any standard mechanism in common use for said purpose.

The action of the mechanism which occurs upon the second pass of the billet through the rolls is merely a reversal of the action brought about during the first pass therethrough. The billet will pass over the trigger 61 without causing any circuit closing action of the circuit closing mechanism, but as it passes over the trgger 61' it will cause the circuit to be closed by the contactors H and I being moved against the terminals 58 and 59, and the circuit will be closed through the coil F and the various conductors and switches as above outlined, and the motor G will again rotate in the forward direction. The operation of the motor will continue until the brush 13 is brought into contact with the segment 4 opposite the point C, when the motor will be stopped, and the roll O will have been brought into the proper position relative to the roll P for operating upon the billet as it is again passed from the right-hand side of the apparatus in the same direction as it was first passed therethrough but with a smaller degree of space between the rolls than was provided during said first pass.

A similar operation of the mechanism occurs as the billet is again passed from the left to the right and the arm 9 then moved to a point opposite the letter "D". When the last pass of the billet through the rolls has been made the arm 9 will be brought to a position opposite the point E and the brush 13 will be in contact with the segment 4, which has been disconnected from the conductor ring 32 by means of its individual switch 5. At this time the brush 11 will be in contact with a segment of the ring 2, which is connected to the conductor ring 31, as above described. A circuit through the electro-magnetic switch S will then be closed, the current flowing through the conductor 99 and the coil S, thence through the conductor 100 to the terminal 55, across a blade 46 of the switch M to the terminal 84, thence through the conductors 107, 106 and 28 to the conductor ring 31, then through the individual switch 3 to the segment 2 and through the brush 11 and conductors 17, 18 and 19 upon the arm 9 to the brush 15, thence through the ring 8 to the conductor ring 114, and then through the line conductor 25 to the current source.

When the electro-magnetic switch S is energized the conductors carried thereby, pivoted at the terminals 70, 77 and 81, are drawn upwardly into contact with the terminals 71, 78 and 80, and the contacts with the terminals 74, 91 and 88, respectively, are broken. The switch Y, also carried by the magnetic switch S, is closed at the same time.

When the billet leaves the rolls O and P on its last pass the end thereof rides over the trigger 61 and frees the same so that it may rise to the vertical position during which action it strikes the lever 63 and brings the contactor H against the terminal 58, closing a circuit which allows the current to flow through the line 97 to the terminal 70, across the contactor to the contact 71, thence through the conductor 72 and the coil of the electro-magnetic switch R, thence through the conductors 73, 101 and 82 to the terminal 81, across the contactor to the terminal 80, thence to the contacts 58 and H, through the conductor 128 to the terminal 78, across the contactor to the terminal 77, through the conductor 109 to the terminal 51, across the blade 44 of the switch M to the terminal 86, thence through the conductors 110 and 103 to the conductor ring 114, thence through the line conductor 25 to the current source.

Through the energizing of the coil R the contactors 94 and 95 are caused to close the motor circuits 68, 69, causing the motor G to rotate in a reverse direction to that heretofore described. At the same time the switches V and W, carried by the electro-magnetic switch R, are closed and the switch X carried thereby is opened.

The continuous operation of the motor in the reverse direction is provided for by current flowing through the line conductor 97 to the terminal 70, across the contactor to the terminal 71, thence through the conductor 72 and the coil R, thence through the conductors 73, 101 and 82 to the terminal 81, across the contactor to the terminal 80 to the contact 58, and thence through the conductors 79 and 102, through the switch V carried by the electro-magnetic switch R, thence through the conductor 26 and the conductor ring 33, through an individual switch 7 and a segment 6 to the brush 14 and the conductor 19 to the brush 15, and thence to the conductor ring 8 and the conductor ring 114 to the line conductor 25 and back to the current source.

The electro-magnetic switch S has been held energized during this time by means of a circuit passing from the current source through the coil S, thence through the conductor 100 to the terminal 55, across a blade 46 of the switch M to the terminal 84, through the conductors 107, 106 and 105, thence, when the electro-magnetic switch R is energized, through the switch W to the conductor 103, the conductor ring 114, and thence through the line conductor 25 to the current source.

If the electro-magnetic switch R is not energized, the current will flow from the conductor 106 through the switch X and the conductor 104, thence through the switch Y to the conductor 29 and the conductor ring 30, thence through an individual switch segment to the brush 11, thence across the arm 9 through the conductors 17, 18 and 19 to the brush 15, thence to the conductor ring 8 and the conductor ring 114, and thence through the line conductor 25 to the current source.

The motor continues to operate in the reverse direction until the arm 9 moves to a place opposite the point marked A, at which point the brush 14 comes into contact with the segment 6, which is disconnected from the line 33, and the circuit which energizes the electro-magnetic switch R is opened. The opening of the switch R also breaks the circuit of the electro-magnetic switch S by opening the switch W. The contactors 70, 77 and 81 are then brought to their original positions and the apparatus is in readiness to repeat the entire cycle of operations thus described upon the next piece of work to be rolled.

It will be noted that with a control of the character above described it is unnecessary to employ a skilled operator at the rolls as the setting of the dial will produce identical work upon the successive billets during each of the successive passes and will bring the completed work to a predetermined finished size. The quality of the product will be substantially uniform, inasmuch as each piece rolled is given exactly the same draft on the respective passes and the reliability of the action of the mechanism is insured through the electrical control mechanism just described.

In order to substitute a partial manual control of the apparatus for the full automatic control and at the same time retain the automatic stopping features above described, the five bladed switch M is moved to the left-hand contacts, as shown in Fig. 2, and the knife switch K is thrown to the left connecting the terminals 37 and 38. After the piece has passed through the rolls on the first pass the push button 42 is depressed by the operator and the electro-magnetic switch F is energized. The current flows through the line 97 to the point 70, across the conductor to the terminal 74, through the coil F and thence through the conductor 111 to the terminal 38, across the knife switch to the terminal 37, thence through the conductor 112 to the push button switch 42 to the terminal 50, across the knife switch to the terminal 86, thence through the conductors 110 and 103 to the conductor ring 114, and thence through the line conductor 25 to the current source.

As soon as the motor G has started because of this energization of the switch F, the button switch 42 is released. The circuit is then completed through the conductor 112 to the terminal 48, across the blade 43 of the switch M to the terminal 87, through the conductor 113 to the switch U, thence through the conducor 27 and the conductor ring 32 to an individual switch 5 and the associated segment 4, thence through the brush 13 and across the conductors 18 and 19 upon the arm 9 to the brush 15, thence through the ring 8 to the conductor ring 114 and through the line conductor 25 to the current source.

The circuit is automatically opened when the brush 13 comes in contact with the segment 4 opposite the point B and the motor is stopped by the de-energization of the coil F. After the billet has passed through the rolls the button 42 is again depressed and the above operation is repeated until the desired number of passes through the rolls has been made.

After the last pass has been made and the rolls are to be brought to their original position the switch K is moved to the right-hand contacts connecting the terminals 39 and 40. The button switch 41 is then depressed and the electro-magnetic switch R is closed. The current then flows through the line 97 to the terminal 70, across to the contact 74, thence through the conductor 75 to the terminal 56, across the blade 47 of the switch M to the terminal 85, thence through the conductor 76 and coil R to the conductor 73 to the terminal 39, across the switch K to the point 40, thence through the conductor 102 to the switch V and through the conductor 26 to the conductor ring 33, thence to an individual switch 7 and its associated segment 6, through the brush 14 and conductor 19 upon the arm 9 to the brush 15 and the ring 8, and thence through the conductor ring 114 and the line conductor 25 to the current source.

This circuit remains closed until the arm is in such position opposite the point A that the brush 14 is in contact with a segment 6 which has been disconnected from the conductor ring 33 and the circuit is thus opened. The mechanism is now ready for a repetition of the cycle of operations just described and the switch blade is thrown to the left before commencing operations upon the next billet.

In order to carry out the full manual control of the apparatus the switch M is thrown to the left, as shown in Fig. 2 of the drawings, the switch K is opened and the button switches 41 and 42 are locked in closed position, then as the switch K is turned to the left the motor will be actuated in a forward direction, the current flowing through the line conductor 97 to the terminal 70, through the contactor to the terminal 74, through the coil of the electro-magnetic switch F and conductor 111 to the terminal 38, across the blade of the switch K to the terminal 37, through the conductor 112 and the push button switch 42 which is in closed position to the terminal 50, through the switch blade 44 to the terminal 86, through the conductors 110 and 103 to the conductor ring 114, and thence through the line conductor 25 to the current source.

To operate the motor in the reverse direction the switch K is moved to the right to close the circuit across the contacts 39 and 40, and the current then flows from the current source through the line conductor 97 to the terminal 70, across the contactor of the switch S to the terminal 74, through the conductor 75 to the terminal 56, across the blade 47 of the switch M to the terminal 85, through the conductor 76 to the electro-magnetic switch R, through the conductor 73 to the terminal 39, through the blade of the switch K to the terminal 40, thence through the push button switch 41 which is in closed position to the conductor 103, and thence through the conductor ring 114 to the line conductor 25 to the current source.

The circuits controlled by the switches U, V, X and Y are not essential to the operation of the device to effect the general control of the systems outlined, but said auxiliary circuits constitute a safety means to insure the action of the motor at all times.

The circuits controlled by the switches U and V prevent the accidental restarting of the motor after it has been automatically stopped through the control arm being carried past a disconnected segment and on to the connected segment. When such switches are employed absolute certainty of operation is brought about even though a disconnected segment of the ring has been passed, as the original circuit will have been operated and the secondary circuit will be operated during the momentary passing of the disconnected segment. The motor may be restarted through the action of the trigger switches 61 and 61' or through the button switches 41 and 42.

The circuits controlled by the switches X and Y in a similar manner provide against danger of overlapping a segment connected with conductor 31. In such event, the circuit would be completed through the line conductor 99, the coil S, the conductor 100, the contact 55, across the switch blade 46 of the switch M to the terminal 84, through the conductor 107, switch X, conductor 104, switch Y, conductor 29, conductor ring 30 and then through the segment switch 3 to the segment 2, to the brush 11, across the arm 9 through the conductors 17, 18 and 19 to the brush 15, thence to the ring 8, the conductor ring 114, and through the line conductor 25 to the current source.

Where the control is to be applied to a motor having a comparatively long operating range in either direction of travel, the arm 9 will necessarily move very slowly and under such conditions the trigger switches 61 or 61' may be opened before the brushes 13 or 14 have cleared the disconnected segment sufficiently to have engaged the next segment. The circuit would then be opened prematurely and the system would fail to function. The modified circuit shown in Fig. 10 will obviate this difficulty. All the remaining circuits of the control apparatus are identical with those disclosed in Fig. 2 of the drawings and Fig. 10 merely illustrates supplementary circuits for bringing about certainty of action of the mechanism under the special circumstances described. In place of the contactors H and I being operated directly by the trigger switches 61 and 61' they are actuated by an electro-magnetic switch 121. As shown in Fig. 10 of the drawings, when the trigger switch 61 actuates the lever 63 in the proper direction and closes the switch 124 in the manner illustrated in Figs. 8 and 9, the circuit will be completed through the line conductor and the coil 121, thence through the conductor 123, switch 124, conductor 125, conductor ring 114, and thence to the current source 120. The contactors H and I will then close and the motor is started in the manner heretofore explained. As soon as the switch 124 swings open, the circuit through the coil 121 will remain closed as long as the brush 13 is in contact with the segment disconnected from the conductor 32 and connected to the conductor 119. This maintaining circuit will include the current source, the conductor 123, the switch 122, the conductor 126 and the conductor ring 119, individual switch 3, segment 4, the brush 13, the arm 9, conductors 18 and 19 on the arm 9, the brush 15, the ring 8, the conductor ring 114, and the conductor to the current source at 120.

This circuit is broken as soon as the brush 13 moves over a segment connected with the conductor 32. Thus the secondary circuit will have served to insure against the premature breaking of the main circuit before the connection with the segments 4 connected with the conductor ring 32 was regularly established.

In addition to the special operating features which may be added to the system originally described, I have found it desirable for certain purposes to simplify the control system so as to dispense with the electro-magnetic switch S, with the segment ring 2 and its series of individual switches 3, and with the five bladed switch M and their associated electrical conductors, including the brush 11 and conductor 17 upon the arm 9 when the apparatus is to be used simply as a control for operating an electric motor in stages either in the forward or reverse direction of travel, or both, including means whereby such stages may be readily altered to meet the particular requirements under which said motor is used. By the expression referring to the operation "in stages" is meant the successive operation of the motor for predetermined periods of time of any desired length in one direction after intervals of time, at the will of the operator. Such travel may be followed by a reversal of the action of the motor until it returns to its starting point, or such return may be made similarly in stages.

The special apparatus for operating a motor in the manner just described is shown in Figs. 11 and 12 of the drawings, and the parts therein, insofar as they are identical with those disclosed in Fig. 2, bear the same reference characters.

If an electric motor is required to operate in five stages in the forward direction and then operate continuously in the reverse direction until the original starting point is reached, then the segments in the ring 4 opposite the points A, B, C, D and E are disconnected from the conductor ring 32 by means of their individual switches 5. In the segmental ring 6 the segment 6, opposite the point A, is disconnected from the conductor ring 33 by means of its individual switch 7. All other segments of the ring 4 are connected to the conductor ring 32 and all other segments in the ring 6 are connected to the conductor ring 33. With the arm 9 pointing toward the portion of the device marked A, the knife switch K is turned to the left so as to connect the terminals 37 and 38. When it is desired to start the motor the button switch 42 is depressed and the circuit will be completed through the line conductor 97, conductor 116, coil F, conductor 111 to the terminal 38, across the switch K to the terminal 37, through the button switch 42 and conductors 110 and 103 to the current source 25.

The motor G is now caused to rotate in the forward direction by the action of the contactors 92, 93, supported upon the electromagnetic switch F. This movement of the motor carries the arm 9 toward the point B and the brush clears the disconnected segment of A. The switch 42 may now be released as the secondary circuit will then be established through the switch U supported upon the electro-magnetic switch F, such circuit being through the line conductor 97, conductor 116, coil F, conductor 111 to the terminal 38, across the switch K to the terminal 37, through the conductor 129, switch U, and conductor 131 to the conductor ring 32, thence through the segment switch 5 to the segment 4, and through the brush 13 across the conductors 18, 19, on the arm 9 to the brush 15, and then through the ring 8 to the conductor ring 114 and to the current source at 25.

This circuit remains closed until the brush 13 reaches the disconnected segment 4 opposite the point B, at which point the circuit will be automatically opened, the coil F de-energized and the motor stopped. In exactly similar manner the motor is caused to stop when the arm 9 moves on the dial opposite the points C, D and E, respectively.

When the arm 9 reaches the point E, established as the limit of forward travel of the motor, and it is desired to cause the motor to rotate in the reverse direction until the original starting point is reached, the switch K is thrown to the right, connecting the terminals 39 and 40.

The button switch 41 is then depressed and the circuit will be established from the source through the line conductor 97, conductor 115, coil R, conductor 73 to the terminal 39, across the blade of the switch K to the terminal 40, thence through the button switch 41, conductor 103 to the current source at 25.

The motor will be caused to rotate and will carry the arm 9 in a counter clockwise direction. Upon the energization of the coil R the secondary circuit will be established through the line conductor 97, conductor 115, coil R, conductor 73 to the terminal 39, across the blade of the switch K to the terminal 40, thence through the conductor 132, switch V, conductor 130, thence to the conductor ring 33 and the segment ring 6, thence to the brush 14, across the conductor 19 on the arm 9 to the brush 15, thence through the ring 8 to the conductor ring 114 to the current source at 25. This circuit will remain closed until the brush 14 comes into contact with the disconnected segment in the ring 6 opposite the point A. The circuit will be then opened and the coil de-energized and the motor G stopped. The apparatus is now in position for the repetition of the entire cycle of operations just described.

Should it be desired to assume manual control of the control apparatus disclosed in Figs. 11 and 12, the button switches 41 and 42 are locked in closed position and the motor is controlled by manipulation of the switch K.

The contacts 52, 54, and 57, of the switch M establish connections which prevent undesirable counter currents being set up.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A controller for electric circuits having in combination a supporting member, a contact ring formed of a plurality of segments, an arm pivoted within said ring, a circuit terminal contact carried by said arm, means to produce relative motion between said segment ring and said contact arm to bring said elements successively into contact therewith, a second circuit terminal, connections between said segment ring and said second circuit terminal including a plurality of individual switches for selectively establishing contact between said individual segments and said second circuit terminal.

2. A controller for electric circuits, having in combination a supporting member, a plurality of concentric segment contact rings mounted on said member, an arm pivoted centrally of said contact rings, a plurality of circuit terminal contacts carried by said arm in position to make contact with said respective segment rings, means to produce relative motion between said segment rings and said contact arm to bring said elements successively into contact, a plurality of separate circuit terminals corresponding with the respective circuit terminals on said contact arm, and means for connecting said individual segments with said respective circuit terminals.

3. A controller for electric circuits, having in combination a supporting member, a plurality of concentric segment contact rings mounted on said member, an arm pivoted centrally of said contact rings, a plurality of circuit terminal contacts carried by said arm in position to make contact with said respective segment rings, means to produce relative motion between said segment rings and said contact arm to bring said elements successively into contact, a plurality of separate circuit terminals corresponding with the respective circuit terminals on said contact arm, and carried by said supporting member, and means connected with said individual segments for connecting the segments with the adjacent circuit terminals.

4. A controller for electric circuits, having in combination a supporting member, a plurality of concentric segment contact rings mounted on said member, an arm pivoted centrally of said contact rings, a plurality of circuit terminal contacts carried by said arm in position to make contact with said respective segment rings, means to produce relative motion between said segment rings and said contact arm to bring said elements successively into contact, a plurality of separate circuit terminals corresponding with the respective circuit terminals on said contact arm, and carried by said supporting member and individual contact switches disposed adjacent the separate segments of the respective contact rings for connecting and disconnecting the segments from the adjacent circuit terminals.

5. A controller for an electric motor, having in combination a supporting member, a contact ring formed of a plurality of segments, an arm pivoted within said ring, a circuit terminal contact carried by said arm, connections between said arm and the motor to be controlled by said device to bring the contact on said arm successively into contact with successive segments of said ring, a second circuit terminal and connection between segments of said ring and said second circuit terminal.

6. A controller for electric circuits, having in combination a supporting member, a plurality of concentric segment contact rings mounted on said member, an arm pivoted centrally of said contact rings, a plurality of circuit terminal contacts carried by said arm in position to make contact with said respective segment rings, connections between said arm and the device to be controlled to bring the contacts on said arm succesively against successive segments of said rings, a plurality of terminals corresponding with the respective circuit terminals on said contact arm, and means for connecting said individual segments with said respective circuit terminals.

7. A controller for electric circuits, having in combination a series of contact members supported in closely spaced relation, a single contact member, means to produce relative motion between said member and said series of members to establish contact with the members of said series successively, a circuit terminal connected with said single contact, a second circuit terminal, and individual means for connecting and disconnecting said members of said series in relation to said second circuit terminal.

8. A controller for electric circuits, having in combination a plurality of series of contact members supported in closely spaced relation in each respective series, a single contacting member for establishing contact with the respective members of said plurality of series, means to produce relative motion between said contacting member and all of said series of members to bring them into respective contact successively, a circuit terminal connected with said single contact, an individual circuit terminal for each series of contacts and separate connections with the respective contacts thereof including individual means for connecting and disconnecting the contacts of the respective series in relation to their respective circuit terminals.

9. A controller for an electric motor, having in combination a supporting member, a plurality of concentric segment contact rings mounted on said member, an arm pivoted centrally of said contact rings, a plurality of circuit terminal contacts carried by said arm in position to make contact with said respective segment rings, means driven by said motor to produce relative motion between said segment rings and said contact arm to bring said elements successively into contact, a plurality of separate circuit terminals for said contact rings, and means for connecting said individual segments with said respective circuit terminals, and for disconnecting any preselected segments.

10. A controller for electric circuits, having in combination a plurality of series of contact members supported in closely spaced relation in each respective series, a single contacting member for establishing contact with the respective members of said plurality of series, means to produce relative motion between said contacting member and all of said series of members to bring them into respective contact successively, a circuit terminal connected with said single contact, an individual circuit terminal for each series of contacts and separate connections with the respective contacts thereof.

11. A controller for electric motors, having in combination a series of contact members supported in closely spaced relation, a single contact member, means associated with said motor to produce relative motion between said member and said series of members to establish contact with the members of said series successively, a circuit terminal connected with said single contact, a second circuit terminal, and connections between members of said series of contact members and said second circuit terminal.

12. A controller for electric motors, having in combination a series of contact members supported in closely spaced relation, a single contact member, means associated with said motor to produce relative motion between said member and said series of members to establish contact with the members of said series successively, a circuit terminal connected with said single contact, a second circuit terminal, and individual means for connecting and disconnecting members of said series with said second circuit terminal.

13. A controller for electric motors, having in combination a plurality of series of contact members supported in closely spaced relation in each respective series, a single contacting member for establishing contact with the respective members of said plurality of series, means associated with said motor to produce relative motion between said contacting member and all of said series of members to bring them into respective contact successively, a circuit terminal connected with said single contact, an individual circuit terminal for each series of contacts and separate connections with the respective contacts thereof.

14. A controller for electric motors, having in combination a plurality of series of contact members supported in closely spaced relation in each respective series, a single contacting member for establishing contact with the respective members of said plurality of series, means associated with said motor to produce relative motion between said contacting member and all of said series of members to bring them into respective contact successively, a circuit terminal connected with said single contact, an individual circuit terminal for each series of contacts, and individual means for connecting and disconnecting the contacts of the respective series to and from their respective circuit terminals.

15. A controller for electric circuits, having in combination a series of contact members supported in closely spaced relation, a single contact member, means to produce relative motion between said member and said series of members to establish contact with the members of said series successively, a circuit terminal connected with said single contact, a plurality of second circuit terminals, and individual means for connecting and disconnecting members of said series in relation to said second circuit terminals.

16. A controller for electric circuits, having in combination a plurality of series of contact members supported in closely spaced relation in each respective series, a single contacting member for establishing contact with the respective members of said plurality of series, means to produce relative motion between said contacting member and all of said series of members to bring them into respective contact successively, a circuit terminal connected with said single contact, a plurality of individual circuit terminals for each series of contacts and separate connections with the respective contacts thereof including individual means for connecting and disconnecting the contacts of the respective series in relation to their respective circuit terminals.

Signed by me this 14th day of November, 1931.

CLAUDE M. KNIGHT.